United States Patent
Nair et al.

(10) Patent No.: US 7,185,323 B2
(45) Date of Patent: Feb. 27, 2007

(54) USING VALUE SPECULATION TO BREAK CONSTRAINING DEPENDENCIES IN ITERATIVE CONTROL FLOW STRUCTURES

(75) Inventors: Sreekumar R. Nair, Sunnyvale, CA (US); Santosh G. Abraham, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 591 days.

(21) Appl. No.: 10/439,910

(22) Filed: May 16, 2003

(65) Prior Publication Data
US 2004/0230960 A1    Nov. 18, 2004

(51) Int. Cl.
*G06F 9/45* (2006.01)

(52) U.S. Cl. .................. 717/140; 717/141; 717/142; 717/150

(58) Field of Classification Search ............. None
See application file for complete search history.

(56) References Cited

U.S. PATENT DOCUMENTS

| | | | | |
|---|---|---|---|---|
| 4,825,360 A | * | 4/1989 | Knight, Jr. | 718/106 |
| 5,704,053 A | * | 12/1997 | Santhanam | 717/158 |
| 6,263,428 B1 | * | 7/2001 | Nonomura et al. | 712/239 |
| 6,675,374 B2 | * | 1/2004 | Pieper et al. | 717/141 |
| 6,928,645 B2 | * | 8/2005 | Wang et al. | 718/102 |

\* cited by examiner

*Primary Examiner*—Wei Zhen
*Assistant Examiner*—Chih-Ching Chow
(74) *Attorney, Agent, or Firm*—Park, Vaughan & Fleming, LLP

(57) ABSTRACT

One embodiment of the present invention provides a system that uses value speculation to break constraining dependencies in loops. The system operates by first identifying a loop within a computer program, and then identifying a dependency on a long-latency operation within the loop that is likely to constrain execution of the loop. Next, the system breaks the dependency by modifying the loop to predict a value that will break the dependency, and then using the predicted value to speculatively execute subsequent loop instructions.

24 Claims, 5 Drawing Sheets

USING VALUE SPECULATION TO BREAK CONSTRAINING DEPENDENCIES IN ITERATIVE CONTROL FLOW STRUCTURES

BACKGROUND

1. Field of the Invention

The present invention relates to compiler-based techniques for optimizing the performance of computer programs within computer systems. More specifically, the present invention relates to a method and an apparatus that uses value speculation to break constraining dependencies in iterative control flow structures, such as loops.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to memory can take hundreds of clock cycles to complete, during which time the processor is typically idle, performing no useful work.

The majority of the cache misses occur in iterative control flow structures (or simply, loops). Existing hardware and software prefetching techniques can effectively prefetch data and/or instructions for simple counted loops and for regular strided data streams. However, many commercial applications, such as databases, execute more complicated loops, that derive little benefit from conventional prefetching techniques. Inside these more complicated loops, the values of missing loads are often used to determine branch conditions (which creates a control dependence) or to perform other computations (which creates a data dependence). This causes each iteration of the loop to wait until the constraining control/data dependences (from the missing loads to their uses) are resolved, before proceeding with the next iteration. Thus, these circular dependence chains limit how many iterations (and consequently how many cache misses) can be executed in parallel.

Hence, what is needed is a method and an apparatus for prefetching load values (and for eliminating other constraining control and/or data dependencies) for more complicated loops.

SUMMARY

One embodiment of the present invention provides a system that uses value speculation to break constraining dependencies in loops. The system operates by first identifying a loop within a computer program, and then identifying a dependency on a long-latency operation within the loop that is likely to constrain execution of the loop. Next, the system breaks the dependency by modifying the loop to predict a value that will break the dependency, and then using the predicted value to speculatively execute subsequent loop instructions.

In a variation on this embodiment, the dependency can be a data dependency or a control flow dependency.

In a variation on this embodiment, the long-latency operation is a missing load operation that is likely to generate a cache miss.

In a variation on this embodiment, identifying the loop involves identifying a loop that generates a large number of cache misses during program execution.

In a variation on this embodiment, speculatively executing subsequent instructions within the loop involves executing prefetching instructions for missing load operations based on predicted values.

In a variation on this embodiment, modifying the loop involves identifying loop variants, P, that are used to compute missing load addresses, and also identifying a set of instructions, G, within the loop that are used to compute the loop variants, P (excluding missing loads and loop exit conditions). It also involves identifying remaining instructions, F, in the loop body excluding G, and identifying conditions, C, and/or data, D, that are computed in F and are used in G. The system then generates a specialized version of F, PredF, that uses value speculation to obtain predicted values, PredC and/or PredD, for C and/or D. The system also generates a specialized version of G, PredG, that speculates the next value of P, SpecP, based on PredC and/or PredD. Finally, the system generates code for PredF, PredG, F and G, so that PredF generates PredC and/or PredD, PredG uses PredC and/or PredD to determine SpecP, and PredF uses SpecP to generate prefetches for the missing load operations.

In a variation on this embodiment, generating code for PredF, PredG, F and G, involves generating a prologue loop that executes only PredF and PredG to generate initial prefetches. It also involves generating a subsequent kernel loop that executes PredF, PredG, F and G, whereby prefetches generated by the prologue loop are likely to eliminate initial load misses generated by F and G in the kernel loop.

In a variation on this embodiment, the speculative execution is performed in a committal manner by performing a checkpointing operation prior to commencing speculative execution, and committing results of the speculative execution to the architectural state of the processor during the speculative execution.

In a variation on this embodiment the speculative execution is performed in a non-committal manner by performing prefetching operations during speculative execution, but not committing results of the speculative execution to the architectural state of the processor, and then executing the speculatively executed instructions again during non-speculative execution.

In a variation on this embodiment, predicting the value within the loop that will break the dependency can involve predicting, a branch outcome, a value of a missing load, or an intermediate value computed from the missing load.

In a variation on this embodiment, the system resides within a compiler.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
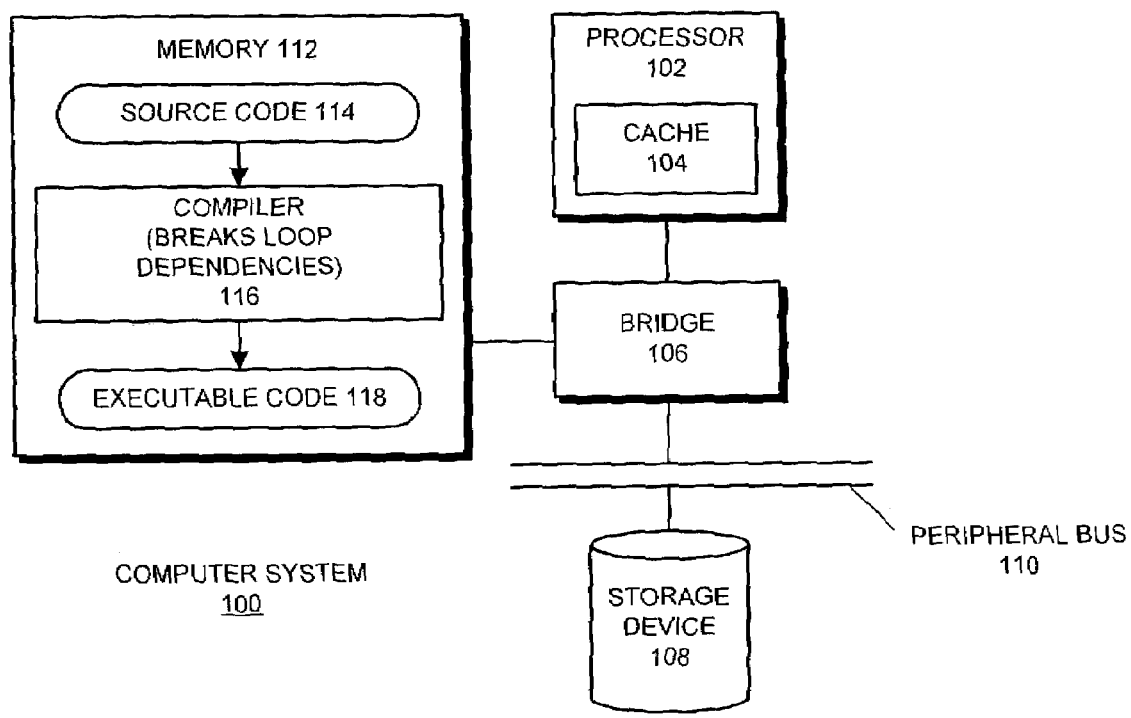
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Note that the effect of a prefetch operation is to cause a cache line to be retrieved from memory 112 into cache 104 before processor 102 accesses the cache line. Also note that many computer systems employ both a level-two (L2) cache as well as a level-one (L1) cache. In this type of computer system, a prefetching operation causes a cache line to be pulled into L2 cache as well as L1 cache. Moreover, the following discussion relating to prefetching an L1 cache line also applies to prefetching an L2 cache line. Furthermore, the present invention can also be applied to computer systems with more than two levels of caches.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code 118. In doing so, compiler 116 breaks loop dependencies, which can involve inserting explicit prefetch instructions into executable code 118 as is described in more detail below with reference to FIGS. 2–8.

Note that although the present invention is described in the context of computer system 100 illustrated in FIG. 1, the present invention can generally operate on any type of computing device that can accommodate explicit prefetch instructions. Hence, the present invention is not limited to the specific computer system 100 illustrated in FIG. 1.

Compiler

Figure 2:
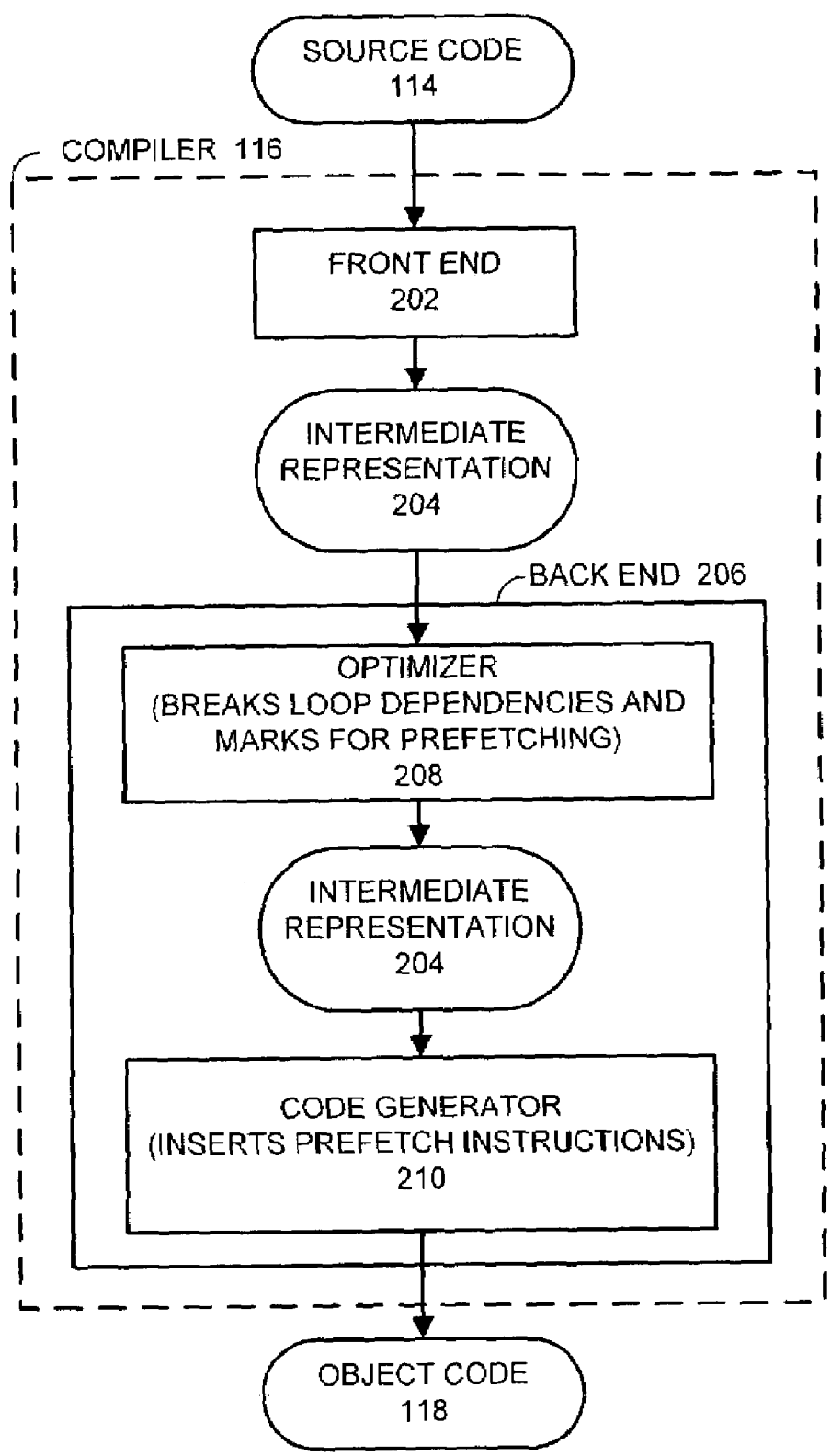
FIG. 2 illustrates a compiler in accordance with an embodiment of the present invention.

FIG. 2 illustrates the structure of compiler 116 in accordance with an embodiment of the present invention. Compiler 116 takes as input source code 114 and outputs executable code 118. Note that source code 114 may include any computer program written in a high-level programming language, such as the JAVA™ programming language. Executable code 118 includes executable instructions for a specific virtual machine or a specific processor architecture.

Compiler 116 includes a number of components, including as front end 202 and back end 206. Front end 202 takes in source code 114 and parses source code 114 to produce intermediate representation 204.

Intermediate representation 204 feeds into back end 206, which operates on intermediate representation 204 to produce executable code 118. During this process, intermediate representation 204 feeds through optimizer 208, which identifies and breaks loop dependencies as is described below with reference to FIGS. 3–5. In doing so, optimizer 208 can mark data references within the code as candidates for prefetching. The output of optimizer 208 feeds into code generator 210, which generates executable code 118. In doing so, code generator 210 inserts prefetching instructions into the code in advance of associated data references.

One embodiment of the present invention provides a general compiler technique that that breaks constraining control/data dependences by applying value speculation. This technique can handle a large variety of loops.

Figure 4:
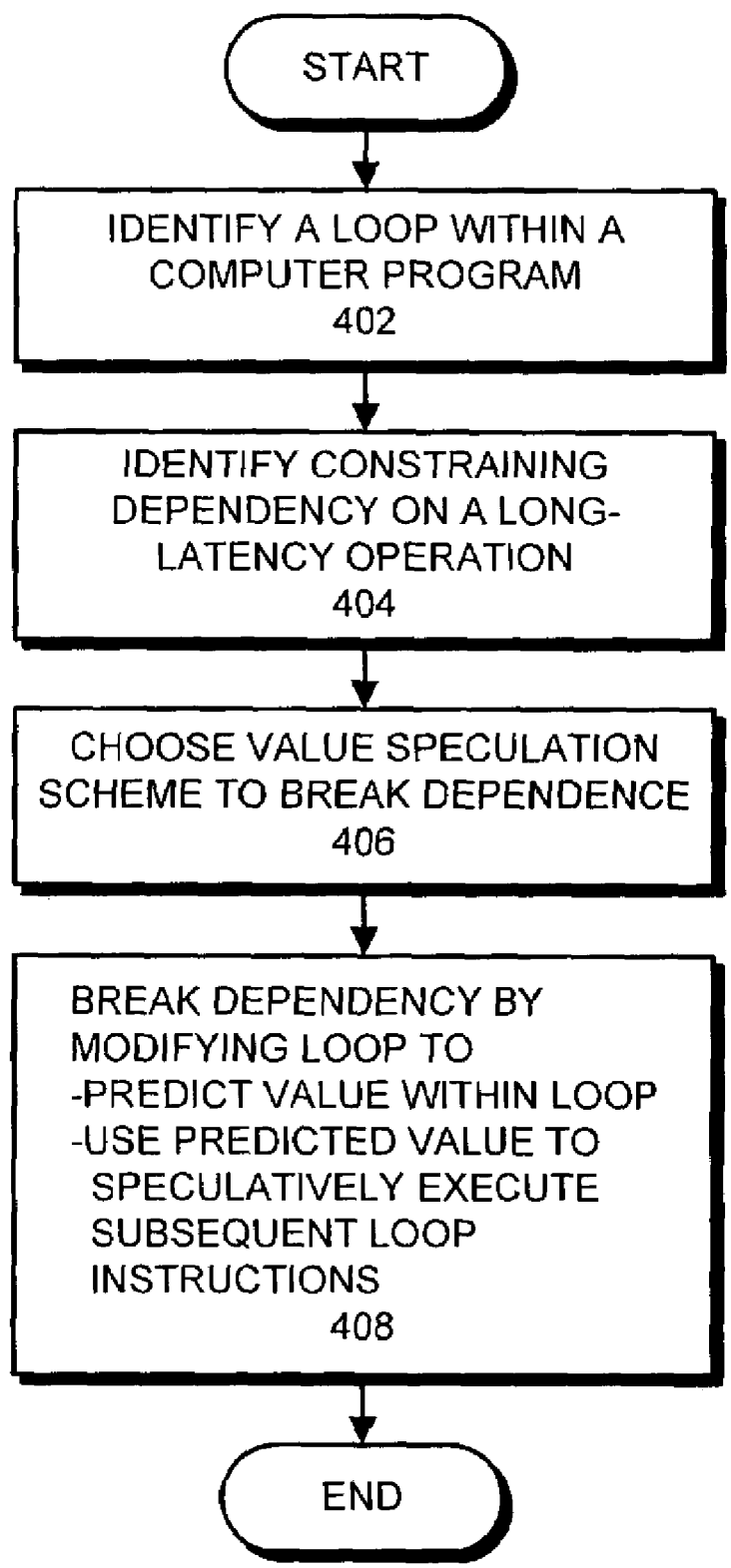
FIG. 4 presents a flow chart illustrating how a loop is modified to break constraining dependencies in accordance with an embodiment of the present invention.

Referring to FIG. 4, the technique generally operates by identifying a loop within a computer program (step 402), and then identifying a loop constraining dependence chain originating from a long-latency operation (step 404). Next, the system chooses an appropriate value speculation scheme to break the dependence (step 406), and transforms the loop so that multiple loop iterations and multiple cache misses can be processed in parallel in situations where performance is dominated by memory accesses (step 408). This may involve using the value speculation scheme to predict a value, and then speculatively executing subsequent loop iterations. Note that the performance of this technique scales almost linearly with the parallel handling of cache misses.

In this technique, the code that breaks the constraining dependence is executed "speculatively," which means that this code does not alter the architectural state—or the external user visible state—of the program. Moreover, this speculative execution can be performed using two schemes, a committal scheme and a non-committal scheme.

In the committal scheme, results computed by the speculative execution are committed to architectural state of the processor. For example, a load miss that is followed by a dependent (long stall) computational operation is converted into: prefetch→predict→compute→verify→commit/recover. We make a prediction for the missing load value and use the predicted value in performing the dependent computation. When the actual value is available, we attempt to confirm that the prediction is correct. If the prediction is not correct, all speculatively computed results are discarded and the results are recomputed using the correct values (this calls for the original values to be checkpointed before starting the speculative computation). If the prediction is correct, the speculatively computed results are committed.

In the non-committal scheme, results computed by the speculative execution are discarded (not committed to architectural state). In this scheme, the above-described conversion looks like: prefetch→predict→compute→discard result. Hence, the value prediction is only used to accelerate the constraining dependence chain operations leading to next cache miss. For example, value prediction can be used to generate prefetching operations. All actual computations are delayed until the load value is available.

In this mode we execute the constraining dependence twice: once with predicted values; and later with non-speculative values, (after the prefetches have completed). In the mode, we do not need to checkpoint the values before speculative execution since we do not need them in the recovery stage. Although the following disclosure describes the non-committal mode of speculative execution, it is a simple matter to transform the technique to perform committal speculative execution.

Note that it is difficult to prefetch data values using conventional compiler techniques in many situations: (1) when the addresses of the loads are computed very late, and we consequently do not have enough time to prefetch for the data; (2) when the control path leading to the missing load is difficult to predict, making it difficult to place the prefetches in the correct place (a prefetch along a wrong path will increase code size and increase stress on memory system due to wasted memory operations).

Even if we are able to surmount these problems in some situations, it is difficult to generalize these solutions across the board. The present invention provides a generic technique that uses value speculation to perform data prefetches in the presence of strong control/data dependences (like the ones mentioned above). It is a very straightforward transformation that can be applied to a very wide category of regular and irregular loops, even in cases where conventional prefetching techniques fail.

Many optimizing processors (and compilers) have exploited value prediction (also referred to as value speculation) to perform useful tasks. For example, compilers have tried to improve branch predictability based on value prediction for loads that these branches are dependent on, or to speculatively execute beyond load misses using predicted values for the missing loads. In general, value speculation can be beneficial in compiler techniques for: (1) resolving branches that depend on missing loads; (2) predicting the results of address computations that depend on missing loads; and (3) delaying load misses from stalling a pipeline.

In one embodiment of the present invention, we employ value speculation to break constraining dependencies in iterative control flow structures (loops). More specifically, we use value prediction to break cyclic dependence chains (actually a subset of the data dependence graph of the original loop with back edges that form cycles). The actual dependence that we break may be either due to predicting a branch outcome or the value of the missing load or some other intermediate computation based on the load miss.

However, the same technique can be extended to any other type of constraining dependencies as well. The framework of this invention generally permits us to resolve any type of dependencies. Only that the strategy adopted for each type of dependency may be different (in the above case, prefetching is the strategy to break memory dependencies). Hence, this invention is applicable to a wide variety of constraining dependencies that stall execution of iterative control structures.

General Technique

Figure 3A:
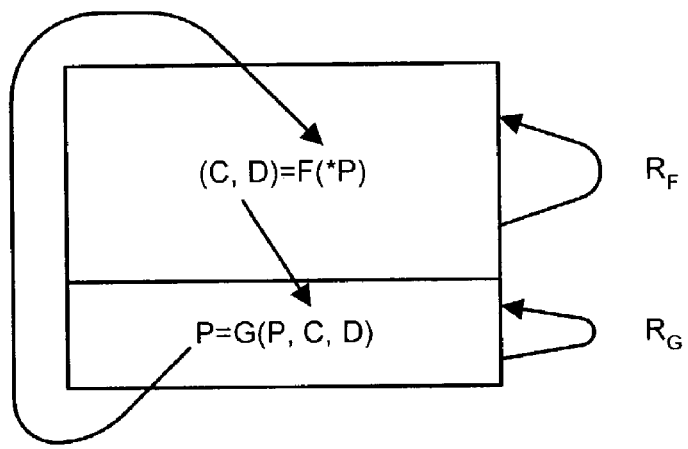
FIG. 3A illustrates how a loop body can be partitioned in accordance with an embodiment of the present invention.

The general technique operates on any (regular or irregular) iterative control flow structure (loop) that contain cyclic constraining dependences on a long-latency operation (like a load miss). This technique operates by first partitioning of the iterative control flow structure (loop) into two parts, F and G that are constrained by a dependence (as is illustrated in FIG. 3A).

Starting from the long-latency operations in the data dependence graph of the iterative control flow structure, we build a subgraph that includes all descendants. If this subgraph does not have cycles that contain a long-latency operation, we are done.

On the other hand, if the subgraph contains cycles that involve long-latency operations, we need to break these cycles. We first determine which operations are most predictable in the cycle, and use the results of this determination to choose which dependencies to break. Once we have broken these dependencies, another data flow analysis is performed to identify the predecessors of the missing load. The operations in this subgraph form G. The remaining instructions form F.

At the end of the first phase, we will have reduced the loop to this abstract form:

```
do {
    (C, D) = F(*P);
    P = G(P, C, D);
} while (P);
``` where:
P: Loop-variants used to compute missing load addresses;
G: Backward slices of P excluding missing loads and loop exit conditions;
F: Rest of the loop body excluding G (this is the big bulk of the loop);
C: Conditions computed in F used in G; and
D: Data computed in F used in G.

This notation is explained in more detailed below.

The transformation involves: generating a specialized version of F (PredF) that uses value speculation to predict the control/data dependences, thereby breaking the constraining dependences from F to G; generating a specialized version of G (SpecG) that speculates the next values of P (SpecP) based on the predictions made by PredF; and generating code for F, G, PredF and SpecG such that the above operations (prefetch→speculative execution→deferred load and its uses) are spread across multiple iterations of the loop. The concepts are very similar to modulo scheduling. We reduce the recurrence MII (minimum initiation interval) by breaking dependencies. But the long-latency does control the number of stages, which is ~ original MII/new targeted MII. The number of stages controls how far the PredF and SpecG needs to run ahead of actual F and G. The transformed code is based on this estimate.

The identification of F, G and P, the generation of PredF and SpecG and the actual transformation that generates code for F, G, PredF and SpecG can be automated in a way to make this a generic technique that will work for a broad variety of loops.

Note that this technique is applicable to irregular loops, which pose difficulty to conventional compiler techniques for data prefetching. Even in the case of regular loops, the performance improvement resulting from these transformations will be comparable to those obtained through specialized analysis done by conventional prefetching techniques in the compiler.

The speculative optimization phase can be either non-committal or committal. Currently the illustrations in this disclosure illustrate non-committal speculative execution. But we can use committal speculative execution as well where the output of PredF is used as the input to G, instead of SpecG, but where both F and G are checkpointed, and where the PredF output is compared to actual output of F after some delay. If the comparison fails, we recover to a previous checkpoint.

In this disclosure we concentrate on value speculation in the context of a constraining-dependence chains that contain load misses. We use value prediction to break cyclic dependence chains (actually a subset of the data dependence graph of the original loop with back edges that form cycles). The actual dependence that we break may be either due to predicting a branch outcome or the value of the missing load or some other intermediate computation based on the load miss.

Note that in general this technique is not limited to dependence chains that contain load misses. The technique can be extended to other types of constraining dependencies as well. The framework of this invention permits us to resolve any type of dependencies, only that the strategy adopted for each type of dependency may be different. (In the above case, prefetching is the strategy to break memory dependencies.) Hence, this invention is applicable to a wide scope of constraining dependencies that stall execution of iterative control structures.

General Scheme

One embodiment of the present invention provides a general-purpose scheme for speculative code generation that applies to all forms of loops (regular and irregular) and is primarily useful for prefetching data that are blocked by control and data dependencies. The input to this technique is any (regular or irregular) iterative control flow structure (loop) that contains cyclic constraining dependences on a long-latency operation (like a load miss).

The Template

As was described above, the technique partitions the loop body into F and G:

```
do {
    (C, D) = F(*P);
    P = G(P, C, D);
} while (P);
``` such that:
P: Loop-variants used to compute missing load addresses;
G: Backward slices of P excluding missing loads+loop exit conditions;
F: Rest of the loop body excluding G (this is the big bulk of the loop);
C: Conditions computed in F used in G; and
D: Data computed in F used in G.

Note that G factors in the loop termination conditions and sets each element of P to NULL when the loop termination conditions are satisfied and the clause "while (P)" breaks the loop at the appropriate time. Also note that F dereferences the elements of P while computing the missing load address —hence the notation F(*P). Furthermore, note that the constraining recurrence from F to G dependent on memory latency accounts for the major runtime overheads of the loop. This optimization breaks this dependency by employing control/data speculation.

The Transformation

The transformation involves generating two subsets PredF (from F) and SpecG (from G) where: PredF is the minimal subset of F that can predict the control/data dependencies (PredC, PredD) that breaks the constraining memory arc from F to G; and SpecG is the minimal subset of G that can speculate the next value of the loop variants (SpecP).

Figure 3B:
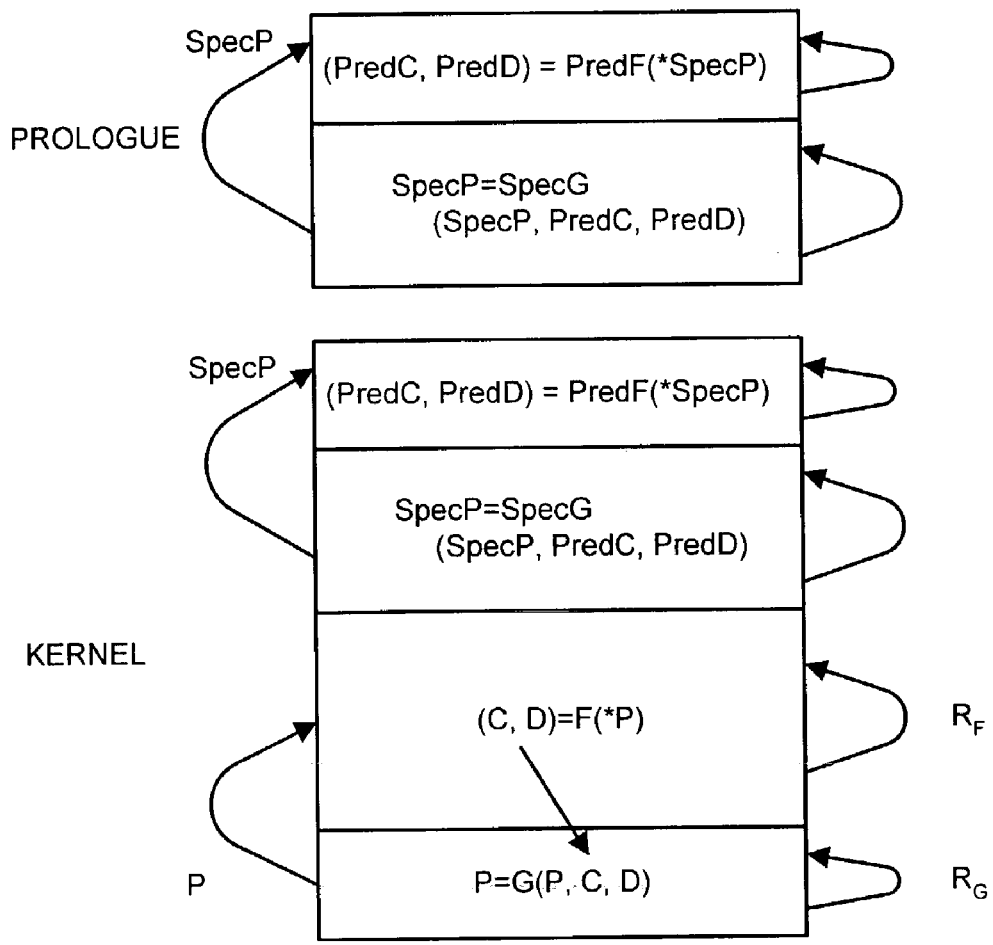
FIG. 3B illustrates how a loop body can be transformed in accordance with an embodiment of the present invention.

The transformation produces code of the following form as is illustrated in FIG. 3B.

```
SpecP = P;
i = PFDIST;
// Prolog:
while (i--) { // Speculative Execution
    (PredC, PredD) = PredF(*SpecP);
    SpecP = SpecG(SpecP, PredC, PredD);
    if (!SpecP) break;
}
// Kernel:
do {
    // Speculative Execution:
    if (SpecP)
    {
        (PredC, PredD) = PredF(*SpecP);
        SpecP = SpecG(SpecP, PredC, PredD);
    }
    // Normal Execution:
    (C, D) = F(*P);
    P = G(P, C, D);
} while (P);
```

Figure 5:
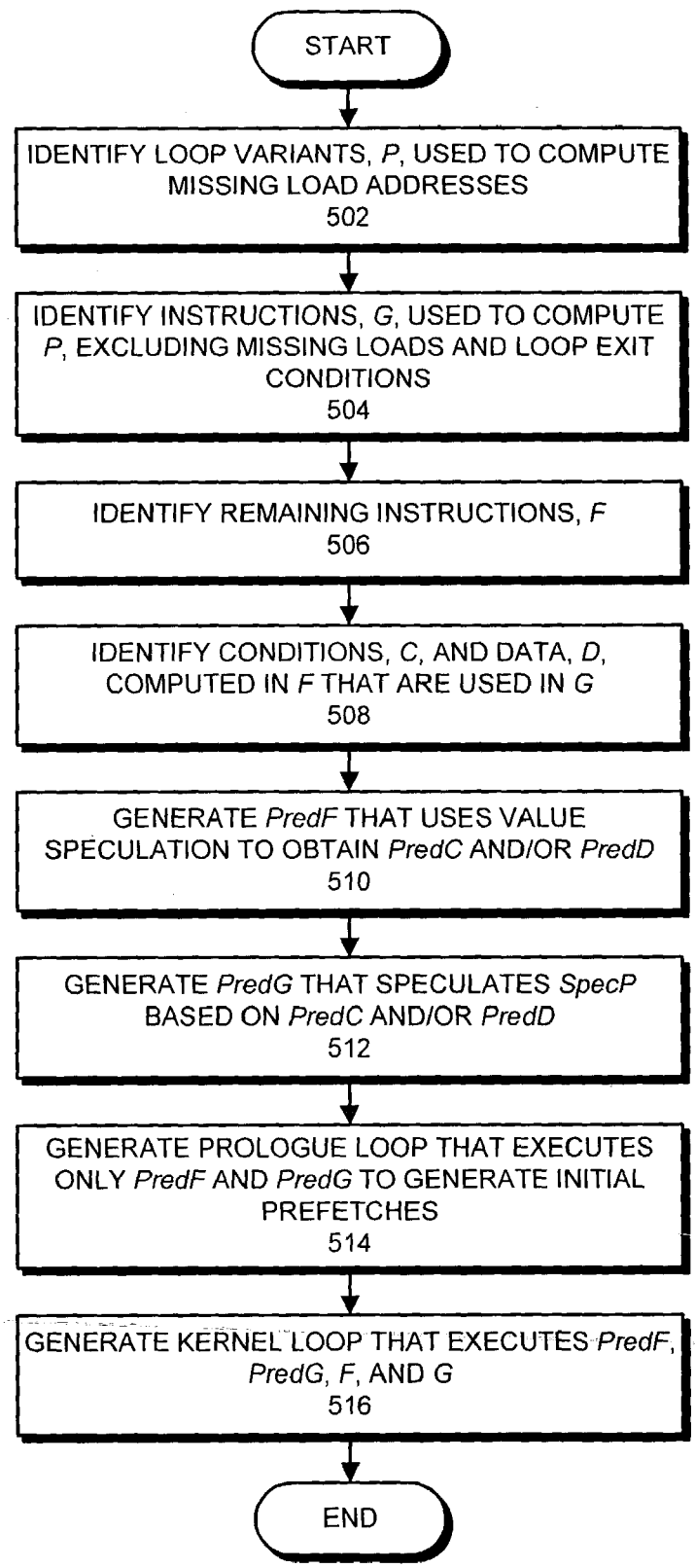
FIG. 5 presents a flow chart illustrating in more detail how the loop is modified in accordance with an embodiment of the present invention.

Referring to FIG. 5, the transformation operates in the following manner for the special case of missing load operations. The system first identifies loop variants, P, that are used to compute missing load addresses (step 502). The system also identifies a set of instructions, G, within the loop that are used to compute the loop variants, P, excluding missing loads and loop exit conditions (step 504). The system additionally identifies remaining instructions, F, in the loop body excluding G (step 506), and also identifies conditions, C, and/or data, D, that are computed in F and are used in G (step 508). The system then generates a specialized version of F, PredF, that uses value speculation to obtain predicted values, PredC and/or PredD, for C and/or D (step 510), and also generates a specialized version of G, PredG, that speculates the next value of P, SpecP, based on PredC and/or PredD (step 512).

Finally, the system generates code for PredF, PredG, F and G, so that PredF generates PredC and/or PredD, PredG uses PredC and/or PredD to determine SpecP, and PredF uses SpecP to generate prefetches for the missing load operations. In doing so, the system generates a prologue loop that executes only PredF and PredG to generate initial prefetches (step 514), and then generates a subsequent kernel loop that executes PredF, PredG, F and G (step 516). In this way, prefetches generated by the prologue loop are likely to eliminate initial load misses generated by F and G in the kernel loop.

The Transformation

The transformation that exploits value speculation to break the constraining control/data dependences in loops comprises of the following steps:

```
TransformLoop(Loop L) {
    (P,F,G,C,D)=IdentifyValueSpeculationComponents(L);
    (PredF, PredC, PredD)=GeneratePredF(F,P,C,D);
    (SpecG,SpecP)=GenerateSpecG(G,PredC,PredD);
    GenerateFinalCode(L,P,F,G,C,D,
        PredF,SpecG,PredC,PredD, SpecP);
};
(P, F, G, C, D)
IdentifyValueSpeculationComponents(L) {
    For each missing load M in the loop L {
        Add to P the loop variant expressions
        that compute the address of M.
    }
    For each expression p in P {
        Add to G the backward slice of P
        (excluding the missing loads)
    }
    For each exp P that determines a loop exit cond {
        Modify the exp to set P to NULL if a loop exit
        condition is satisfied, add this modified
        expression to G.
    }
    Set F to include all expressions in L not in G.
    Set C to include all conditions evaluated in F and
        used in G(constraining control dependence).
    Set D to include all data evaluated in F and used
        in G(constraining data dependence).
}
(PredF, PredC, PredD)
GeneratePredF(F, P, C, D) {
    Add code in PredF to reduce the latency of the
    Constraining dependence. For example, prefetch for
    the missing load. Employ a strategy to
    speculatively break the constraining control
    dependence. This is done one a case-by-case basis.
        if (C) {
            Add in PredF the code to control speculate the
            loop- closing branch. Set the value of PredC
            appropriately.
        }
    // Employ a strategy to speculatively break the
    // constraining data dependence: This needs to be
    // done one a case-by-case basis:
    if (D) {
        Add in PredF the code to data speculate (value
        Predict) the value of the missing load.
        Set the value of PredD appropriately.
    }
}
(SpecG, SpecP)
GenerateSpecG(G, PredC, PredD)
{
    if (PredC or PredD indicates the termination of
        the loop) {
            Set SpecP to NULL.
        } else {
            Set SpecP to continue next speculative
            iteration of the loop.
        }
}
GenerateFinalCode(L,P,F,G,C,D,PredF,SpecG,PredC,PredD,
    SpecP) {
    Replace loop L with the following code and
```

```
optimize away any Constant sub-expressions or
constants propagated as arguments:
SpecP = P;
i = PFDIST;
// Prolog:
while (i--) { // Speculative Execution
    (PredC, PredD) = PredF(*SpecP);
    SpecP = SpecG(SpecP, PredC, PredD);
    if (!SpecP) break;
}
// Kernel:
do {
// Speculative Execution:
if (SpecP) {
    (PredC, PredD) = PredF(*SpecP);
    SpecP = SpecG(SpecP, PredC, PredD);
}
// Normal Execution:
(C, D) = F(*P);
P = G(P, C, D);
} while (P);
}
```

Example 1

Using Control Value Speculation

Consider the following example with the tight loop with a large trip count:

```
while (pcount++ <= nscan) {
    if (pp->p_vnode && pp->p_state)
        break;
    pp = page_next (pp);
}
```

It is known that the de-references of "pp" (pp->p_vnode and pp->p_state) miss heavily on the cache. Thus, the loop execution is dominated by the control dependence on these two dereferences of "pp":

```
if (pp->p_vnode && pp->p_state)
    break;
```

Only if we break this dependence will we be able to speculatively execute the next iterations of the loops (and thereby overlap the load misses from multiple iterations of the loop).

In this case, we use control speculation to predict a value for the control dependence variable (to make it easy we assume that the branch is always taken) and thereby break the memory dependence from the load miss to the branch.

The loop transformation proceeds along the following steps:

Step 1—Identifying Value Speculation Components

```
P = {pp}
F(*P) {
    if (pp->p_vnode && pp->p_state)
        return C=true;
    else
```

-continued

```
        return C=false;
    }
    G(P, C, D) {
        if (!C && (pcount++ <= nscan))
            return page_next(P);
        else
            return NULL;
    }
```

Step 2—Generating PredF and SpecG

The constraining arc from F to G is based on the control dependence C computed from the values of pp. Based on our knowledge about the high trip count of this loop, we can predict that C is always false (that is the loop is always taken).

```
    PredF(*SpecP) {
        Prefetch(SpecP);
        return PredC=false;
    }
    SpecG(SpecP, PredC, PredD) {
        if (!PredC && (Specpcount++ <= nscan))
            return spec_page_next(P);
        else
            return NULL;
    }
```

In the above code, spec_next_page( ) is a cloned version of the function page_next( ) that is speculation-safe. Note that the compiler will be able to optimize away many expressions that we have elaborated for clearly explaining the transformation. For example, with the knowledge that PredC is false, the expression,

```
    if (!PredC && (Specpcount++ <= nscan))
        return spec_page_next(P);
``` will be optimized to,

```
    if (Specpcount++ <= nscan)
        return spec_page_next(P);
```

Step 3—Final Code

```
    SpecP = pp;
    i = PFDIST;
    Specpcount = pcount;
    Prologue: while (i--) {
        Prefetch(SpecP);
        SpecP = spec_page_next(SpecP);
        if (!SpecP || (Specpcount++ > nscan))
            break;
    }
    Kernel: while (pcount++ <= nscan) {
        // Speculative Execution:
        if (SpecP && (Specpcount++ <= nscan)) {
            Prefetch(SpecP);
            SpecP = spec_page_next(SpecP);
        }
        // Normal Execution:
```

```
        if (pp->p_vnode && pp->p_state)
            break;
        pp = page_next(pp);
    }
```

EXAMPLE

Using Data Value Speculation

Consider the following loop which traverses a graph of nodes (this example is from the hottest function in SPE-Cint2000 benchmark 181.mcf):

```
    refresh_potential( )
        while (node) {
            if (node->orientation == UP) {
                node->potential = node->basic_arc->cost
                    + node->pred->potential;
            } else {
                node->potential = node->pred->potential
                    - node->basic_arc->cost;
                checksum++;
            }
            node = node->child;
        }
```

Here "node" is a graph node and the loop iterates by successively visiting the "child" of each "node." Along each iteration, the top missing load is node->orientation. However, our experience also tells us that this is not the only load that is going to cause a problem. For example, if we were able to prefetch for node->orientation or value predict for this load, the loop will stall at the loads of other expressions like node->potential, node->basic_arc, etc.

The key to continue execution is by predicting the next value of "node" itself. This is typically difficult to do, but there are many ways of predicting the address of the next "node" (using hardware or compiler means). In this particular example, we assume that the compiler uses a special allocator that lays out consecutively allocated memory chunks in contiguous memory locations. With our knowledge that (a) the size of each "node" is 64 bytes and that (b) the nodes are referenced in exactly the same order as they are created and that (c) the consecutively accessed locations are laid out in contiguous memory locations, we can make a data value prediction that the next node is yielded by the operation: node=node+64; which will break the constraining dependency and help us to speculatively continue execution of the loop.

The loop transformation progresses through the following steps.

Step 1—Identifying Value Speculation Components

```
    P = {node}
    F(*P) {
        node = P;
        if (node->orientation == UP) {
            node->potential = node->basic_arc->cost
                + node->pred >potential;
        } else {
            node->potential = node->pred->potential
                - node->basic_arc->cost;
            checksum++;
```

-continued

```
    }
    D = node->child;
}
G(P) {
    P = D
}
```

Step 2—Generating PredF and SpecG

```
PredF(*SpecP) {
    Prefetch (SpecP);
    PredD += 64;
}
SpecG (PredD) {
    SpecP = PredD;
    return SpecP;
}
```

Step 3—Final Code

```
while (P) {
    if (SpecP) {
        PredF:
            Prefetch(SpecP);
            PredD += 64;
        SpecG
            SpecP=PredD;
    }
    F:
        node = P;
        if (node->orientation == UP) {
            node->potential = node->basic_arc->cost
                + node->pred->potential;
        } else {
        node->potential = node->pred->potential
            - node->basic_arc->cost;
        checksum++;
        }
        D = node->child;
    G:
        P = D;
}
```

Special Techniques to Improve Effectiveness

When we make certain value speculations like the one we did in the second example where we assumed:

node=node+64;

there is a chance that the speculative execution may get out of sync with the normal execution. Hence, we will need to do some special handling to sync up the speculative code with the normal code. One way of doing this is to change SpecP to sync up with P once in a few iterations. For example,

```
if (synccount++ % 100)
    SpecP = P + (PREFDIST * 64);
```

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method that uses value speculation to break constraining dependencies in loops, comprising:
    identifying a loop within a computer program;
    identifying a dependency on a long-latency operation within the loop that is likely to constrain execution of the loop, wherein the long-latency operation is a missing load operation that is likely to generate a cache miss; and
    breaking the dependency by modifying the loop to,
        predict a value within the loop that will break the (DGPS) dependency, and to
        use the predicted value to speculatively execute subsequent instructions within the loop, wherein speculatively executing subsequent instructions within the loop involves executing prefetching instructions for missing load operations based on predicted values;
    wherein modifying the loop involves:
        identifying loop variants, P, that are used to compute missing load addresses,
        identifying a set of instructions, G, within the loop that are used to compute the loop variants, P, excluding missing loads and loop exit conditions,
        identifying remaining instructions, F, in the loop body excluding G,
        identifying conditions, C, and/or data, D, that are computed in F and are used in G,
        generating a specialized version of F, PredF, that uses value speculation to obtain predicted values, PredC and/or PredD, for C and/or D,
        generating a specialized version of G, PredG, that speculates the next value of P, SpecP, based on PredC and/or PredD, and
        generating code for PredF, PredG, F and G, so that PredF generates PredC and/or PredD, PredG uses PredC and/or PredD to determine SpecP, and PredF uses SpecP to generate prefetches for the missing load operations.

2. The computer-implemented method of claim 1, wherein the dependency can be one of:
    a data dependency; and
    a control flow dependency.

3. The computer-implemented method of claim 1, wherein identifying the loop involves identifying a loop that generates a large number of cache misses during execution of the computer program.

4. The computer-implemented method of claim 1, wherein generating code for PredF, PredG, F and G, involves:
    generating a prologue loop that executes only PredF and PredG to generate initial prefetches; and
    generating a subsequent kernel loop that executes PredF, PredG, F and G;
    whereby prefetches generated by the prologue loop are likely to eliminate initial load misses generated by F and C in the kernel loop.

5. The computer-implemented method of claim 1, wherein speculatively executing subsequent instructions in the loop involves performing the speculative execution in a committal manner by:
    performing a checkpointing operation prior to commencing speculative execution; and committing results of the speculative execution to the architectural state of the processor during the speculative execution.

6. The computer-implemented method of claim 1, wherein speculatively executing subsequent instructions in the loop involves performing the speculative execution in a non-committal manner by:
  performing prefetching operations during speculative execution, but not committing results of the speculative execution to the architectural state of the processor; and
  executing the speculatively executed instructions again during non-speculative execution.

7. The computer-implemented method of claim 1, wherein predicting the value within the loop that will break the dependency involves predicting:
  a branch outcome;
  a value of a missing load; or
  an intermediate value computed from the missing load.

8. The computer-implemented method of claim 1, wherein the method is performed by a compiler.

9. A computer-readable storage medium storing instructions that when executed by a computer cause the computer to perform a method that uses value speculation to break constraining dependencies in loops, the method comprising:
  identifying a loop within a computer program;
  identifying a dependency on a long-latency operation within the loop that is likely to constrain execution of the loop, wherein the long-latency operation is a missing load operation that is likely to generate a cache miss; and
  breaking the dependency by modifying the loop to,
    predict a value within the loop that will break the dependency, and to
    use the predicted value to speculatively execute subsequent instructions within the loop, wherein speculatively executing subsequent instructions within the loop involves executing prefetching instructions for missing load operations based on predicted values;
  wherein modifying the loop involves:
    identifying loop variants, P, that are used to compute missing load addresses,
    identifying a set of instructions, G, within the loop that are used to compute the loop variants, P, excluding missing loads and loop exit conditions,
    identifying remaining instructions, F, in the loop body excluding G,
    identifying conditions, C, and/or data, D, that are computed in F and are used in G,
    generating a specialized version of F, PredF, that uses value speculation to obtain predicted values, PredC and/or PredD, for C and/or D,
    generating a specialized version of G, PredG, that speculates the next value of P, SpecP, based on PredC and/or PredD, and
    generating code for PredF, PredG, F and G, so that PredF generates PredC and/or PredD, PredG uses PredC and/or PredD to determine SpeeP, and PredF uses SpecP to generate prefetches for the missing load operations.

10. The computer-readable storage medium of claim 9, wherein the dependency can be one of:
  a data dependency; and
  a control flow dependency.

11. The computer-readable storage medium of claim 9, wherein identifying the loop involves identifying a loop that generates a large number of cache misses during execution of the computer program.

12. The computer-readable storage medium of claim 9, wherein generating code for PredF, PredG, F and G, involves:
  generating a prologue loop that executes only PredF and PredG to generate initial prefetches; and
  generating a subsequent kernel loop that executes PredF, PredG, F and G;
  whereby prefetches generated by the prologue loop are likely to eliminate initial load misses generated by F and G in the kernel loop.

13. The computer-readable storage medium of claim 9, wherein speculatively executing subsequent instructions in the loop involves performing the speculative execution in a committal manner by:
  performing a checkpointing operation prior to commencing speculative execution; and
  committing results of the speculative execution to the architectural state of the processor during the speculative execution.

14. The computer-readable storage medium of claim 9, wherein speculatively executing subsequent instructions in the loop involves performing the speculative execution in a non-committal manner by:
  performing prefetching operations during speculative execution, but not committing results of the speculative execution to the architectural state of the processor; and
  executing the speculatively executed instructions again during non-speculative execution.

15. The computer-readable storage medium of claim 9, wherein predicting the value within the loop that will break the dependency involves predicting:
  a branch outcome;
  a value of a missing load; or
  an intermediate value computed from the missing load.

16. The computer-readable storage medium of claim 9, wherein the method is performed by a compiler.

17. A computer apparatus that uses value speculation to break constraining dependencies in loops, comprising:
  a loop identification mechanism configured to identify a loop within a computer program;
  a dependency identification mechanism configured to identify a dependency on a long-latency operation within the loop that is likely to constrain execution of the loop, wherein the long-latency operation is a missing load operation that is likely to generate a cache miss; and
  a dependency breaking mechanism configured to break the dependency by modifying the loop to,
    predict a value within the loop that will break the dependency, and to
    use the predicted value to speculatively execute subsequent instructions within the loop;
  wherein the dependency breaking mechanism is configured to modify the loop to execute prefetching operations during speculative execution for missing load operations based on predicted values; and
  wherein the dependency breaking mechanism is configured to modify the loop to:
    identify loop variants, P, that are used to compute missing load addresses,
    identify a set of instructions, G, within the loop that are used to compute the loop variants, P, excluding missing loads and loop exit conditions,
    identify remaining instructions, F, in the loop body excluding G,
    identify conditions, C, and/or data, D, that are computed in F and are used in G, generate a specialized version of F, PredF, that uses value speculation to obtain predicted values, PredC and/or PredD, for C and/or D, generate a specialized version of G, PredG, that speculates the next value of P, SpecP, based on PredC and/or PredD, and to generate code for PpedF, PredG, F and G, so that PredF generates PredC and/or PredD, PredG uses PredC and/or PredD to determine SpecP, and PredF uses SpecP to generate prefetches for the missing load operations.

18. The computer apparatus of claim 17, wherein the dependency can be one of:

data dependency; and a control flow dependency.

19. The computer apparatus of claim 17, wherein the loop identification mechanism is configured to identify a loop that generates a large number of cache misses during execution of the computer program.

20. The computer apparatus of claim 17, wherein generating code for PredF, PredG, F and G involves:

generating a prologue loop that executes only PredF and PredG to generate initial prefetches; and generating a subsequent kernel loop that executes PredF, PredG, F and G;

whereby prefetches generated by the prologue loop are likely to eliminate initial load misses generated by F and G in the kernel loop.

21. The computer apparatus of claim 17, wherein the dependency breaking mechanism is configured to modify the loop to:

perform a checkpointing operation prior to commencing speculative execution; and to commit results of the speculative execution to the architectural state of the processor during the speculative execution.

22. The computer apparatus of claim 17, wherein the dependency breaking mechanism is configured to:

perform prefetching operations during speculative execution, but not committing results of the speculative execution to the architectural state of the processor; and to execute the speculatively executed instructions again during non-speculative execution.

23. The computer apparatus of claim 17, wherein the dependency breaking mechanism is configured to modify the loop to predict:

a branch outcome;

a value of a missing load; or an intermediate value computed from the missing load.

24. The computer apparatus of claim 17, wherein the apparatus is part of a compiler.

* * * * *

UNITED STATES PATENT AND TRADEMARK OFFICE
CERTIFICATE OF CORRECTION

| | | |
|---|---|---|
| PATENT NO. | : 7,185,323 B2 | Page 1 of 1 |
| APPLICATION NO. | : 10/439910 | |
| DATED | : May 16, 2003 | |
| INVENTOR(S) | : Sreekumar R. Nair | |

It is certified that error appears in the above-identified patent and that said Letters Patent is hereby corrected as shown below:

In claim 9 (at column 15, line 57), delete the variable, "SpeeP" and replace with the variable --SpecP--.

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,185,323 B2 | |
| APPLICATION NO. | : 10/439910 | |
| DATED | : February 27, 2007 | |
| INVENTOR(S) | : Sreekumar R. Nair | |

It is certified that error appears in the above-identified patent and that said Letters Patent is hereby corrected as shown below:

In claim 9 (at column 15, line 57), delete the variable, "SpeeP" and replace with the variable --SpecP--.

This certificate supersedes Certificate of Correction issued April 17, 2007.

Signed and Sealed this

Eighth Day of May, 2007

JON W. DUDAS
*Director of the United States Patent and Trademark Office*